United States

Shimokura 4,214,815

Jul. 29, 1980

[54] SEMI-WIDE ANGLE OBJECTIVE LENS
[75] Inventor: Toshiko Shimokura, Hachioji, Japan
[73] Assignee: Konishiroku Photo Industry Co., Ltd., Tokyo, Japan
[21] Appl. No.: 913,018
[22] Filed: Jun. 6, 1978
[30] Foreign Application Priority Data Jun. 23, 1977 [JP] Japan .................. 52-73881

[51] Int. Cl.² .......................... G02B 9/60; G02B 9/62
[52] U.S. Cl. .................................... 350/215; 350/216
[58] Field of Search ....................... 350/216, 215, 176
[56] References Cited

U.S. PATENT DOCUMENTS

| | | | |
|---|---|---|---|
| 2,622,478 | 12/1952 | Kleinberry et al. | 350/215 |
| 3,926,503 | 12/1975 | Takahashi et al. | 350/215 |
| 3,938,882 | 2/1976 | Oishi | 350/214 |

FOREIGN PATENT DOCUMENTS

| | | | |
|---|---|---|---|
| 288792 | 6/1953 | Switzerland | 350/215 |
| 531115 | 12/1976 | U.S.S.R. | 350/216 |

Primary Examiner—Paul A. Sacher
Attorney, Agent, or Firm—Lane, Aitken, Ziems, Kice & Kananen

[57] ABSTRACT

A semi-wide angle objective lens in accordance with the present invention comprises five groups of six lens elements including a front group and a rear group in which the front group has a first group which includes a single positive meniscus lens $L_1$ with its convex surface directed toward the object side, a second group which includes a single negative meniscus lens $L_2$ with its convex surface directed toward the object side, and a third group which includes a single positive meniscus lens $L_3$ with its convex surface directed toward the object side; and in which the rear group has a fourth group which includes both a negative lens $L_4$ with its front concave surface having a large curvature directed toward the object side and a positive lens $L_5$ with its rear convex surface having a large curvature directed toward an image side with the fourth group lenses cemented together or arranged with an extremely small air space therebetween, and a fifth group which includes a positive lens $L_6$ characterized in that each of the following conditions is fulfilled:

$$1.4\, f < |f_2| < 2.0\, f \tag{1}$$

$$0.23\, f < r_4 < 0.33\, f \tag{2}$$

$$0.03\, f < d_4 < 0.08\, f \tag{3}$$

$$0.8 < r_4/r_5 < 1.0 \tag{4}$$

where,
  f is the composite focal length of the entire lens system,
  $f_2$ is the focal length of the lens $L_2$ of the second group ($f_2 < 0$),
  $r_4$ is the radius of curvature of the rear surface of the lens $L_2$ of the second group,
  $d_4$ is the axial air space between the lens $L_2$ of the second group and the lens $L_3$ of the third group, and
  $r_5$ is the radius of curvature of the front surface of the lens $L_3$ of the third group.

7 Claims, 20 Drawing Figures

COMA

SPHERICAL
ABERRATION

ASTIGMATISM

DISTORTION

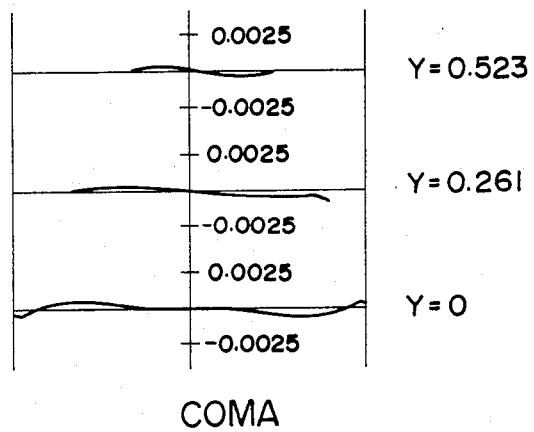
FIG. 3A
COMA
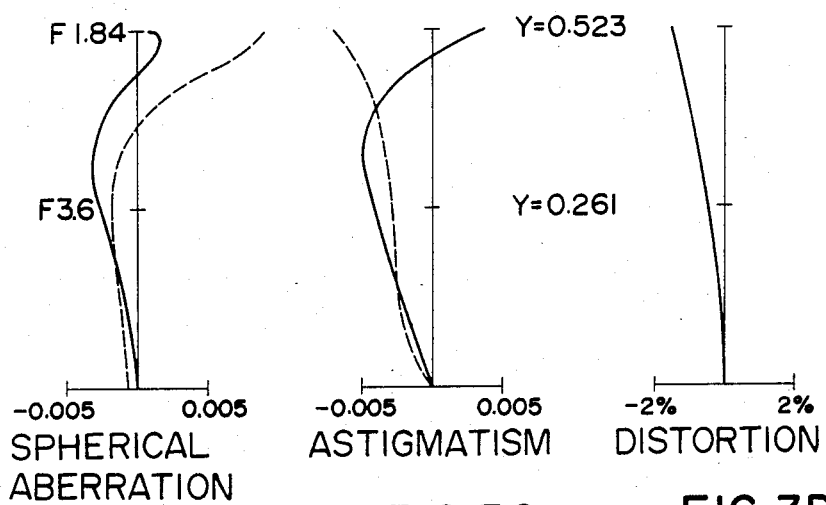
FIG. 3B SPHERICAL ABERRATION
FIG. 3C ASTIGMATISM
FIG. 3D DISTORTION FIG. 4A
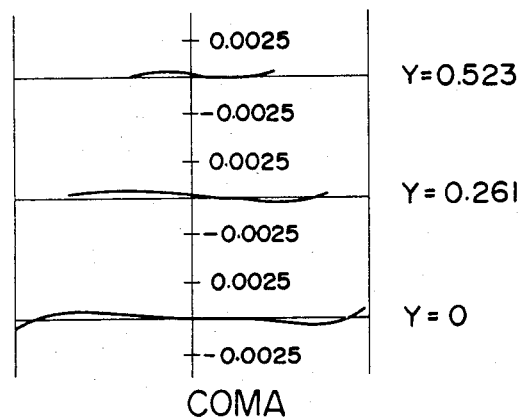
COMA
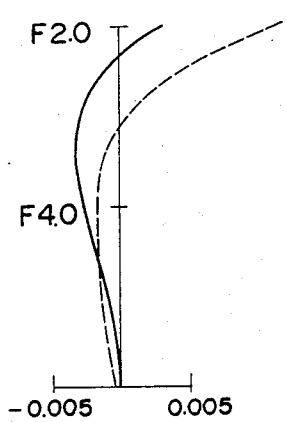
SPHERICAL
ABERRATION
FIG. 4B
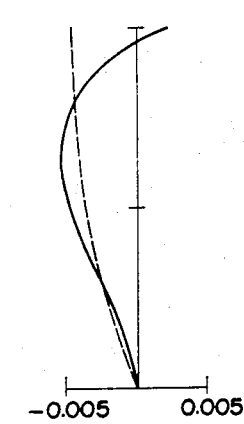
ASTIGMATISM
FIG. 4C
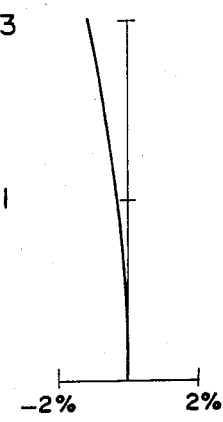
DISTORTION
FIG. 4D

COMA

SPHERICAL ABERRATION

ASTIGMATISM

DISTORTION

FIG. 6A
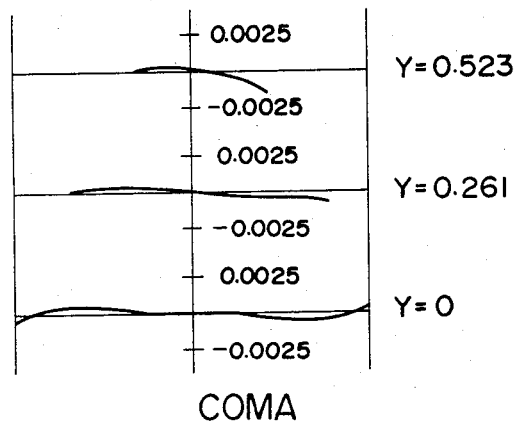
COMA
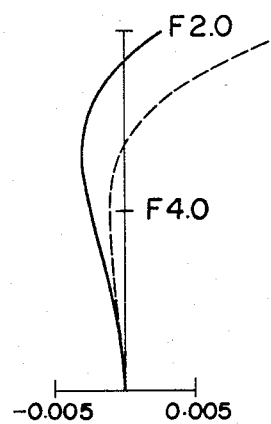
SPHERICAL
ABERRATION
FIG. 6B
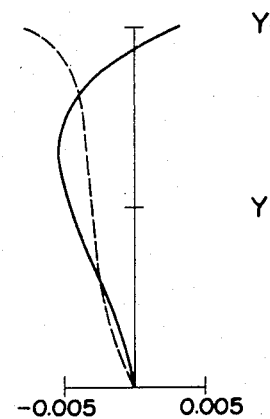
ASTIGMATISM
FIG. 6C
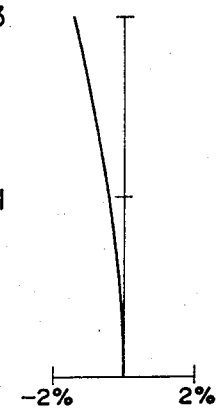
DISTORTION
FIG. 6D

SEMI-WIDE ANGLE OBJECTIVE LENS

BACKGROUND OF THE INVENTION (1) Field of the Invention

This invention relates to an improved semiwide angle objective lens for use with single lens reflex cameras.

(2) Description of the Prior Art

In recent years, there has been an increasing trend towards compact size single lens reflex cameras and, along with this trend a requirement has developed for more compact and wider angle interchangeable lens. The shortest focal length of a standard lens for a 135 mm film format single lens reflex camera has been commonly chosen at 50 mm. However, lens shutter cameras have lenses with approximately equal to 40 mm are very popular. Thus, for SLR cameras, a semi-wide angle objective lens having a value of about f=40 mm has become a standard lens.

A desirable semi-wide angle objective lens having a compact size would have a preferred value of f=40 mm, an F number of F 2 to F 1.8 and a simple lens configuration of six lens elements or so. It has been extremely difficult to apply prior art lenses (e.g., Gaussian type six element lenses) for this purpose and keep the lens back focal length large enough for a single lens reflex camera and also provide a field angle up to about 56°.

The reason why it was so difficult is that keeping the back focal length $f_B$ long requires a smaller setting of the positive power of the front group, resulting in an increased positive power of the rear group making it very difficult to correct residual aberrations with the positive lenses of the rear group.

Another reason for the above mentioned difficulty is that the requirement for a large aperture ranging from F 2 to F 1.8 results in a decreased power of refraction at each lens surface, which leads to difficulty correcting the curvature of the sagittal image surface, making it impossible to maintain a wide angle of view.

Further, even if an attempt is made to obtain a semi-wide angle objective lens by utilizing a lens system of a so-called retrofocus type e.g. a Gauss type or modified Tessar type in which a negative lens is added to the front lens element, the total length of the lens system is increased, or the front lens element is increased in size and the lens is no longer compact.

Because of the reasons mentioned above, it has been extremely difficult to provide a six lens element semi-wide angle objective lens of simple configuration having a large aperture and a compact size.

BRIEF SUMMARY OF THE INVENTION

It is an overall object of the present invention to provide a new and useful semi-wide angle objective lens for use with single lens reflex cameras.

It is further principal object of the present invention to provide a lens system for an extremely compact semi-wide angle objective lens having a simple configuration of five groups of six lens elements in which the back focal length $f_B$ has a value of 0.85 times of the composite focal length f, an angle of view of 56°, an aperture range from F 2 to F 1.8 and in which all aberrations are well corrected.

The above and other objects of the present invention will be apparent from the following detailed description of a preferred embodiment of the present invention taken in conjunction with the accompanying drawings.

BRIEF DESCRIPTION OF THE DRAWINGS

The above description as well as further objects, features, and advantages of the present invention will be more fully understood by reference to the following description of a presently preferred but nonetheless illustrative embodiment in accordance with the present invention, when taken in connection with the accompanying drawing, wherein

FIGS. 3A, 3B, 3C, and 3D show, as labeled, the coma, spherical aberration, astigmatism, and distortion curves for a second embodiment having the basic construction shown in FIG. 1A;

FIGS. 4A, 4B, 4C, and 4D show, as labeled, the coma, spherical aberration, astigmatism, and distortion aberration curves for a third embodiment having the basic construction shown in FIG. 1A.

In each of these figures, the solid line in the spherical aberration curve shows the spherical aberration when d=line (a wave length: 587.56 mµ) is applied and the dotted line shows the spherical aberration when g-line (a wave length: 435.84 mµ) is applied. The solid line in the astigmatism shows a sagittal and the dotted line shows a meridional.

Figure 1A:
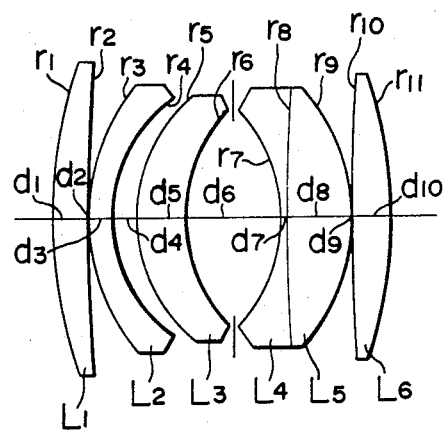
FIGS. 1A and 1B show a basic structural view of a semi-wide angle lens in accordance with the present invention with FIG. 1A showing an arrangement in which two lens elements in the fourth group are cemented together and with FIG. 1B showing an arrangement in which two lens elements in a similar fourth group are arranged with an extremely small air space being left therebetween.
Figure 1B:
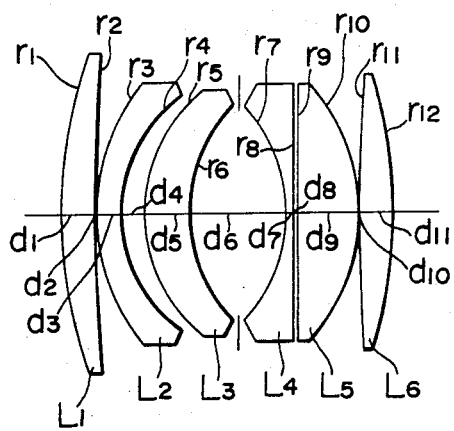
Figure 2A:
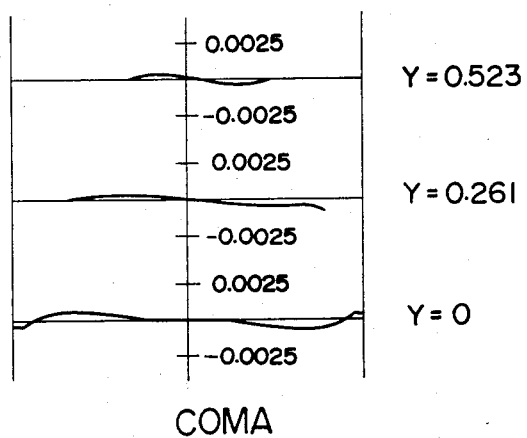
FIGS. 2A, 2B, 2C, and 2D show, as labeled, the coma, spherical aberration, astigmatism, and distortion curves for a first embodiment having the basic construction shown in FIG. 1A.
Figure 2B:
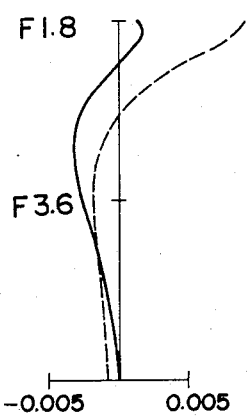
Figure 2C:
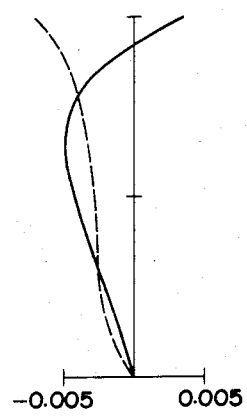
Figure 2D:
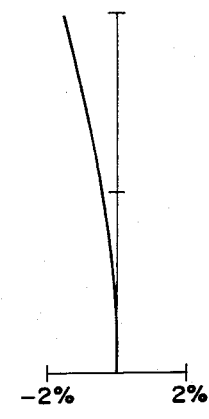
Figure 5A:
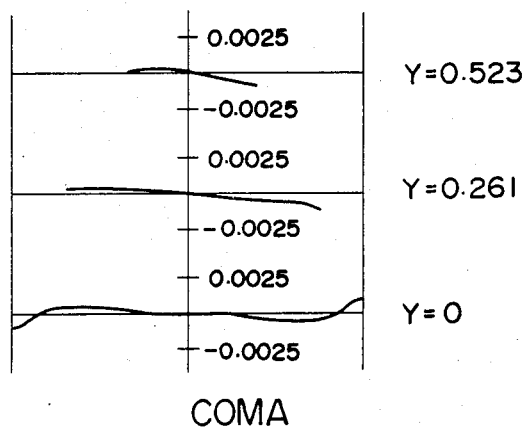
Figure 5B:
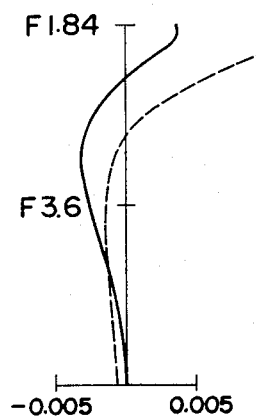
Figure 5C:
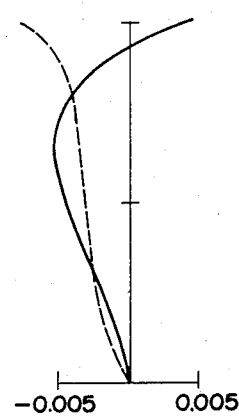
Figure 5D:
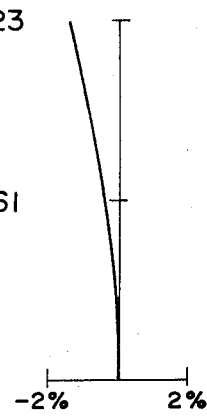

FIGS. 5A, 5B, 5C and 5D show, as labeled, the coma, spherical aberration, astigmatism, and distortion curves for a fourth embodiment having the basic construction shown in FIG. 1B; and FIGS. 6 6B, 6C, and 6D show, as labeled, the coma spherical aberration, astigmatism, and distortion curves for a fifth embodiment in accordance with the basic construction shown in FIG. 1B.

In FIG. 1A, $L_1, L_2, L_3, \ldots L_6$: designates the lenses counted in sequence from the object side $r_1, r_2, r_3, \ldots r_{11}$: designates the radius of curvature of the lens surfaces measured in sequence from the object side, $d_1, d_3, d_5, d_7, d_8, d_{10}$: designates the axial thickness of the lenses measured in sequence from the object side;

$d_2, d_4, d_6, d_9$: designates the axial air space between the lenses measured in sequence from the object side;

and in FIG. 1(B), $L_1, L_2, L_3, \ldots L_6$: designates the lenses counted in sequence from the object side $r_1, r_2, r_3, \ldots r_{12}$: designates the radius of curvature of the lenses surface measured in sequence from the object side $d_1, d_3, d_5, d_7, d_9, d_{11}$: designates the axial thickness of the lens measured in sequence from the object side, and $d_2, d_4, d_6, d_8, d_{10}$: designates the axial air space between the lenses measured in sequence from the object side The solid line in the spherical aberration shows the spherical aberration when d-line (a wave length: 587.56 mμ) is applied and the dotted line shows the spherical aberration when g-line (a wave length: 435.84 mμ) is applied. The solid line in the astigmatism shows a sagittal and the dotted line shows a meridional.

DESCRIPTION OF THE PREFERRED EMBODIMENT

As apparent from the new type of lens shown in FIG. 1 A and B in which the arrangement of the front group of the Gauss type lens of five groups of six lens elements is changed by changing the arrangement of a positive lens, a positive lens and a negative lens to an arrangement of a positive lens, a negative lens and a positive lens, the present invention enables the provision of a lens system for an extremely compact and useful semi-wide angle lens having a back focal length $f_B$ of about 0.85 times as that of a composite focal length f, an angle of view of 56°, and an aperture of F 2 to F 1.8 in which all aberrations are well corrected. A simple, common lens configuration of five groups of six lens elements, which has various problems when used as an interchangeable lens for single lens reflex cameras, may be improved upon by providing a lens system comprising five groups of six lens elements including a front group a rear group in which a first group includes a single positive meniscus lens $L_1$ having its convex surface directed toward a object side, the second group includes a single negative meniscus lens $L_2$ having its convex surface directed toward the object side, and a third group includes a single positive meniscus lens $L_3$ with its convex surface having a large curvature directed toward the object side and in which the rear group includes the fourth group which includes both a negative lens $L_4$ with its front concave surface having a large curvature directed toward the object side and a positive lens $L_5$ with its rear convex surface having a large curvature being directed toward the image side with the fourth group lenses cemented together or arranged with an extremely small air space therebetween and a fifth group includes a positive lens $L_6$ in which each of the following conditions are fulfilled.

$$1.4f < |f_2| < 2.0 f \quad (1)$$

where,
f is the composite focal length of the entire lens system,
$f_2$ is the focal length of the lens $L_2$ of the second group;

$$0.23 f < r_4 < 0.33 f \quad (2)$$

where, $r_4$ is the radius of curvature of the rear surface of the lens $L_2$ of the second group;

$$0.03 f < d_4 < 0.08 f \quad (3)$$

where, $d_4$ is the axial air space between the lens $L_2$ of the second group and the lens $L_3$ of the third group; and $$0.8 < r_4/r_5 < 1.0 \quad (4)$$

where, $r_5$ is the radius of curvature of the front surface of the lens $L_3$ of the third group A technical background of the present invention and the meaning of several conditions are described in more detail as follows.

A new type of the lens in accordance with the present invention is made by replacing the arrangement of prior art Gauss-type lenses, which include five groups of six lens elements of which the front group includes a positive lens, a positive lens, and a negative lens, with an arrangement of a positive lens, a negative lens and a positive lens.

As mentioned in the description of the prior art, a semi-wide angle objective lens with the back focal length long enough for an interchangeable lens and with an aperture large enough for a standard lens is very difficult to provide with the prior art Gauss type or Tessar-type lens configurations.

To avoid the problems mentioned earlier, it is necessary to provide a lens which has a suitably large positive power in the front group as the prior art Gauss type lenses making a large aperture possible and which also has a suitably large emerging paraxial ray height at the end surface of the front group the prior art Tessar type lenses making a long back focal length possible; the new type of lens of the present invention satisfies these properties.

Namely, the suitably large power in the front group is made possible in the lens of the present invention by using the two positive lenses, one of which is located in the first position of the lens system, and one negative lens similar to the prior art Gauss-type lenses; thus keeping the power of the front group large and comparable to that of the Gauss-type lenses.

On the other hand, by changing the arrangement of the lenses in the front group from that of the Gauss-type lenses, which is a positive lens, a positive lens, and a negative lens, to the arrangement of a positive lens, a negative lens, and a positive lens, the type of lens of the present invention enables the attaining of a long back focal length.

Namely, the forward arrangement of the negative lens in the front group makes the emerging paraxial ray height at the end surface of the front group comparable to that of a Tessar type lens, and thus makes it possible for the total lens to have a long back focal length.

In view the arrangement described, major means for realizing a compact lens system having a superior aberration correction is expressed under the following conditions $$1.4 f < f_2 < 2.0 f \quad (1)$$

$$0.23 f < r_4 < 0.33 f \quad (2)$$

$$0.03 f < d_4 < 0.08 f \quad (3)$$

$$0.8 < r_4/r_3 < 1.0 \quad (4)$$

Equation (1) shows a condition in which the negative lens arranged as the lens $L_2$ of the second group has a relatively large divergence action making it possible to obtain a required back focal length $f_B$ without decreasing the composite power of the lenses of the front group when the single focal length is in the range indicated above.

Equation (2) shows a condition in which a substantially large radius of curvature $r_4$ of the lens surface of the meniscus lens $L_2$ of the second group directed toward the image side is provided, and a center of the curvature is approached toward the center of the lens in order to prevent a sagittal image surface from being curved, and then a space between the lens $L_2$ of the second group and the lens $L_3$ of the third group is made small as indicated in the equation (3) to keep the size compact and also to keep the effect described below of a radius of curvature $r_5$ at the object side of the lens $L_3$ of the third group in reference to the equation (4). That is, these equations show the conditions to decrease the aberrations generated by the forward positioned negative lens, which aberrations are larger than those of the prior art arrangement of a positive lens, a negative lens and a negative lens, and thus provide a fast lens.

The reason for the above mentioned setting of the limitation values of each of the conditional equations are described as follows.

Negative power of the lens $L_2$ of the second group exceeding the lower limit of the equation (1) will necessarily increase the positive power of the lens $L_3$ of the third group and thus cause generation of an excessive aberration of each of the surfaces, making it impossible to provide a fast lens. In turn, negative power of the lens $L_2$ of the second group exceeding the upper limit of the equation (1) will decrease the diversive refractive power of the lens $L_2$ of the second group and thus it is impossible to obtain the required back focal length $f_B$.

Exceeding the lower limit of the equation (2) will make the negative refractive power excessive at the rear surface of the lens $L_2$ of the second group, and thus it will become impossible to correct the spherical aberration and coma, and further make it impossible to provide a fast lens. Conversely, exceeding the upper limit of the equation (2) will result in the center of curvature of the rear surface of the lens $L_2$ being moved farther away from the center of the total lens system decreasing the effect of correction of the sagittal image surface.

When the axial air space $d_4$ between the lens $L_2$ of the second group and the lens $L_3$ of the third group is small and exceeds the lower limit of equation (3), a positive refractive power at the front surface of lens $L_3$ decreases in reference to the equation (4), and then it becomes impossible to provide correction of the higher order spherical aberrations which may be generated in the negative lens $L_2$. To the contrary, when the axial air space $d_4$ exceeds the upper limit, a positive refractive power at the front surface of said lens $L_3$ increases, and thus it causes not only the tendency for the image surface to curve towards object side, but also the increase in size of the lens.

Equation (4) provides the relationship between the radii of curvature $r_4$ and $r_5$ with respect to a range of the axial air space $d_4$ given by the equation (3). When the value of $r_4/r_5$ exceeds the lower limit, it will cause an excessive negative refractive power in the front group, and, in a manner similar to the case in which the lower limit of the equation (3) is exceeded, and it is not possible to correct the spherical aberration and, further, it becomes impossible to provide a fast lens. When the upper limit is exceeded, it tends to increase the curvature of the image surface in the same manner as when the upper limit of the equation (3) is exceeded.

That is, under each of the conditions of the equations (1), (2), (3) and (4), it becomes possible to have the front group of the lens system satisfying the properties discussed earlier.

Thus, it is not necessary to have a large positive power in the rear group and thus the simple configuration of the prior art of only two positive lenses may be provided making it possible to correct aberrations easily while keeping the size of the lens compact and keeping the back focal length $f_B$ sufficiently long enough. Further, in order to effect the correction of the aberration, it is preferable to provide the following conditions for the lenses of the rear group;

$$1.8 < n_6 \quad (5)$$

$$20 < \nu_5 - \nu_4 \quad (6)$$

where, $n_6$ is the refractive index of the glass of the lens $L_6$ of the fifth group with respect to d-line, $\nu_4$ and $\nu_5$ are Abbe numbers given by d-line of the component glass of the lenses $L_4$ and $L_5$ of the fourth group.

In order to keep the positive power born by the two positive lenses of the rear group as large as possible even if a positive power of the front group is made to be a relatively large value and a positive power of the rear group is not too high by fulfilling each of the above described conditions and further to keep a large aperture lens of the present invention, it is preferable to maintain the refractive indicies n of the two positive lenses as large as possible. However, it is required that the refractive index of the lens $L_4$ is large, the refractive index of the lens $L_5$ small, $\nu$ of the lens $L_4$ small, and the refractive index of the lens $L_5$ large in order to provide correction for the sagittal image surface in the fourth group and correction for the chromatic aberration and thus it is preferable to have a refractive index of $n_6$ as large as possible.

When it is less than the limit of the equation (5), it is impossible to provide proper corrections for the spherical aberration, distortion etc. in the lenses of the rear group. Along with this effect, the condition shown in the equation (6) is an essential condition of achromatism in the lenses $L_4$ and $L_5$ of the fourth group under such condition as a powerful achromatism in the lens $L_6$ of the fifth group may not be obtained and thus it becomes impossible to provide a chromatic correction in the rear group when it is less than the limitation.

Practical embodiments of the present invention will now be described herebelow.

EMBODIMENT 1

| $f = 1$ F 1.8 | $2\omega = 56°$ | $f_B = 0.8464$ | $\Sigma d = 0.7053$ |
|---|---|---|---|
| $r_1 = 0.9951$ | $d_1 = 0.0725$ | $n_1 = 1.71300$ | $\nu_1 = 53.9$ |
| $r_2 = 3.9769$ | $d_2 = 0.0024$ | | |
| $r_3 = 0.4274$ | $d_3 = 0.0483$ | $n_2 = 1.58144$ | $\nu_2 = 40.7$ |
| $r_4 = 0.2873$ | $d_4 = 0.0531$ | | |
| $r_5 = 0.3052$ | $d_5 = 0.0966$ | $n_3 = 1.67003$ | $\nu_3 = 47.3$ |
| $r_6 = 0.3126$ | $d_6 = 0.2029$ | | |
| $r_7 = -0.3341$ | $d_7 = 0.0217$ | $n_4 = 1.75520$ | $\nu_4 = 27.5$ |
| $r_8 = 38.9089$ | $d_8 = 0.1329$ | $n_5 = 1.67790$ | $\nu_5 = 55.3$ |
| $r_9 = -0.3966$ | $d_9 = 0.0024$ | | |
| $r_{10} = 11.2319$ | $d_{10} = 0.0725$ | $n_6 = 1.88300$ | $\nu_6 = 40.8$ |
| $r_{11} = -0.9167$ | | | |

$f_2 = -1.725$

This is an embodiment of FIG. 1A, and where, $r_1, r_2, \ldots r_{11}$ designates the radius of curvature of the lenses measured in sequence from the object side, $d_1, d_3, d_5, d_7, d_8, d_{10}$ designates the axial thickness of the lenses measured in sequence from the object side, $d_2, d_4, d_6, d_9$ designates the axial air spaces between the lenses measured in sequence from the object side, $n_1, n_2, \ldots n_6$ designates the refractive index of the optical glass of the lenses with respect to the d-line measured in sequence from the object side, and $\nu_1, \nu_2, \ldots$ designates the Abbe number of the optical glass of the lenses measured with respect to d-line in sequence from the object side.

| Seidel's aberrations of Embodiment 1. | | | | |
|---|---|---|---|---|
| | S | C | A | P | D |
| 1 | 0.2466 | 0.1487 | 0.0896 | 0.4183 | 0.3061 |
| 2 | 0.0259 | −0.0982 | 0.3732 | −0.1047 | −1.0202 |
| 3 | 0.5778 | 0.1463 | 0.0371 | 0.8602 | 0.2273 |
| 4 | −6.6261 | −0.2376 | −0.0085 | −1.2799 | −0.0462 |
| 5 | 5.6800 | 0.6946 | 0.0849 | 1.3146 | 0.1712 |
| 6 | −1.6196 | −0.6435 | −0.2557 | −1.2836 | −0.6116 |
| 7 | −3.4114 | 1.2462 | −0.4553 | −1.2878 | 0.6368 |
| 8 | −0.0586 | −0.0691 | −0.0814 | −0.0007 | −0.0967 |
| 9 | 2.6149 | −0.4894 | 0.0916 | 1.0187 | −0.2078 |
| 10 | −0.0001 | 0.0027 | −0.0750 | 0.0418 | 0.9239 |
| 11 | 2.9679 | −0.6796 | 0.1556 | 0.5116 | −0.1528 |
| Σ | 0.3972 | 0.0211 | −0.0438 | 0.2085 | 0.1300 |

Seidel's aberrations show the value when the distance of the object side is set to an infinite point and a diaphragm is set to a position of 0.101 rearward of the sixth lens surface, and the symbols in the table are as follows.
S: spherical aberration
C: coma
A: astigmatism
P: Petzval's condition
D: distortion
Σ: sum of each of the aberrations

EMBODIMENT 2

| $f = 1$ F 1.84 | $2\omega = 56°$ | $f_B = 0.8443$ | $\Sigma d = 0.6940$ |
|---|---|---|---|
| $r_1 = 0.9963$ | $d_1 = 0.0724$ | $n_1 = 1.71300$ | $\nu_1 = 53.9$ |
| $r_2 = 3.9165$ | $d_2 = 0.0024$ | | |
| $r_3 = 0.4165$ | $d_3 = 0.0458$ | $n_2 = 1.58144$ | $\nu_2 = 40.7$ |
| $r_4 = 0.2851$ | $d_4 = 0.0531$ | | |
| $r_5 = 0.3015$ | $d_5 = 0.0965$ | $n_3 = 1.67003$ | $\nu_3 = 47.3$ |
| $r_6 = 0.3057$ | $d_6 = 0.1978$ | | |
| $r_7 = -0.3287$ | $d_7 = 0.0210$ | $n_4 = 1.76182$ | $\nu_4 = 26.6$ |
| $r_8 = 8.4698$ | $d_8 = 0.1303$ | $n_5 = 1.71300$ | $\nu_5 = 53.9$ |
| $r_9 = -0.3998$ | $d_9 = 0.0024$ | | |
| $r_{10} = 11.3076$ | $d_{10} = 0.0724$ | $n_6 = 1.83400$ | $\nu_6 = 37.2$ |
| $r_{11} = -0.8810$ | | | |

$f_2 = -1.782$

This is another embodiment of FIG. 1(A). Each of the symbols used herein is the same as that used in Embodiment 1.

| Seidel's aberrations of Embodiment 2. | | | | |
|---|---|---|---|---|
| | S | C | A | P | D |
| 1 | 0.2457 | 0.1500 | 0.0915 | 0.4178 | 0.3109 |
| 2 | 0.0243 | −0.0944 | 0.3662 | −0.1063 | −1.0085 |
| 3 | 0.6707 | 0.1598 | 0.0381 | 0.8828 | 0.2194 |
| 4 | −6.7190 | −0.2515 | −0.0094 | −1.2897 | −0.0486 |
| 5 | 5.8131 | 0.7110 | 0.0870 | 1.3307 | 0.1734 |
| 6 | −1.7360 | −0.6758 | −0.2631 | −1.3124 | −0.6133 |
| 7 | −3.5823 | 1.2938 | −0.4672 | −1.3155 | 0.6438 |
| 8 | −0.0477 | −0.0511 | −0.0548 | −0.0019 | −0.0608 |
| 9 | 2.6768 | −0.5298 | 0.1049 | 1.0412 | −0.2268 |
| 10 | −0.0003 | 0.0048 | −0.0886 | 0.0402 | 0.8934 |
| 11 | 3.0449 | −0.6941 | 0.1582 | 0.5162 | −0.1537 |
| Σ | 0.3902 | 0.0226 | −0.0373 | 0.2031 | 0.1291 |

Seidel's aberrations show the value when the distance of the object side is set to an infinite point and a diaphragm is set to a position of 0.099 rearward of the sixth lens surface, and the symbols in the table are as follows.
S: spherical aberration
C: coma
A: astigmatism
P: Petzval's condition
D: distortion
Σ: sum of each of the aberrations

EMBODIMENT 3

| $f = 1$ F 2 | $2\omega = 56°$ | $f_B = 0.8518$ | $\Sigma d = 0.6359$ |
|---|---|---|---|
| $r_1 = 0.9272$ | $d_1 = 0.0689$ | $n_1 = 1.71300$ | $\nu_1 = 53.9$ |
| $r_2 = 3.3721$ | $d_2 = 0.0024$ | | |
| $r_3 = 0.4119$ | $d_3 = 0.0447$ | $n_2 = 1.58144$ | $\nu_2 = 40.7$ |
| $r_4 = 0.2803$ | $d_4 = 0.0456$ | | |
| $r_5 = 0.2950$ | $d_5 = 0.0864$ | $n_3 = 1.67003$ | $\nu_3 = 47.3$ |
| $r_6 = 0.3038$ | $d_6 = 0.1816$ | | |
| $r_7 = 0.3076$ | $d_7 = 0.0194$ | $n_4 = 1.71736$ | $\nu_4 = 29.5$ |
| $r_8 = 2.4272$ | $d_8 = 0.1214$ | $n_5 = 1.69680$ | $\nu_5 = 55.5$ |
| $r_9 = 0.3800$ | $d_9 = -0.0024$ | | |
| $r_{10} = -24.2718$ | $d_{10} = 0.0631$ | $n_6 = 1.83400$ | $\nu_6 = 37.2$ |
| $r_{11} = -0.8295$ | | | |

$f_2 = -1.725$

This is another embodiment of FIG. 1(A). Each of the symbols used herein is the same as that used in Embodiment 1.

| Seidel's aberrations of Embodiment 3. | | | | |
|---|---|---|---|---|
| | S | C | A | P | D |
| 1 | 0.3048 | 0.1765 | 0.1022 | 0.4489 | 0.3191 |
| 2 | 0.0224 | −0.0905 | 0.3650 | −0.1234 | −0.9751 |
| 3 | 0.6404 | 0.1760 | 0.0484 | 0.8926 | 0.2586 |
| 4 | −6.9706 | −0.4731 | −0.0321 | −1.3115 | −0.0912 |
| 5 | 6.1149 | 0.8681 | 0.1232 | 1.3601 | 0.2106 |
| 6 | −1.7847 | −0.7033 | −0.2772 | −1.3206 | −0.6297 |
| 7 | −4.5250 | 1.5041 | −0.5000 | −1.3580 | 0.6176 |
| 8 | −0.0387 | −0.0334 | −0.0288 | −0.0029 | −0.0274 |
| 9 | 3.3309 | 0.6375 | 0.1220 | 1.0806 | −0.2302 |
| 10 | −0.0048 | 0.0257 | −0.1366 | −0.0187 | 0.8253 |
| 11 | 3.3502 | −0.8033 | 0.1926 | 0.5482 | −0.1776 |
| Σ | 0.4400 | 0.0092 | −0.0213 | 0.1954 | 0.1000 |

Seidel's aberrations show the value when the distance of the object side is set to an infinite point and a diaphragm is set to a position of 0.091 rearward of the sixth lens surface, and the symbols in the table are as follows.
S: spherical aberration
C: coma
A: astigmatism
P: Petzval's condition
D: distortion
Σ: sum of each of the aberrations

EMBODIMENT 4

| $f = 1$ F 1.84 | $2\omega = 56°$ | $f_B = 0.8434$ | $\Sigma d = 0.6775$ |
|---|---|---|---|
| $r_1 = 0.9841$ | $d_1 = 0.0700$ | $n_1 = 1.71300$ | $\nu_1 = 53.9$ |
| $r_2 = 3.8830$ | $d_2 = 0.0024$ | | |
| $r_3 = 0.4285$ | $d_3 = 0.0459$ | $n_2 = 1.57845$ | $\nu_2 = 41.5$ |
| $r_4 = 0.2865$ | $d_4 = 0.0483$ | | |
| $r_5 = 0.3048$ | $d_5 = 0.0954$ | $n_3 = 1.67003$ | $\nu_3 = 47.3$ |
| $r_6 = 0.3198$ | $d_6 = 0.1981$ | | |
| $r_7 = -0.3290$ | $d_7 = 0.0205$ | $n_4 = 1.76180$ | $\nu_4 = 27.1$ |
| $r_8 = 11.5942$ | $d_8 = 0.0024$ | | |
| $r_9 = 24.1546$ | $d_9 = 0.1292$ | $n_5 = 1.71300$ | $\nu_5 = 53.9$ |
| $r_{10} = -0.3871$ | $d_{10} = 0.0024$ | | |
| $r_{11} = 5.6763$ | $d_{11} = 0.0628$ | $n_6 = 1.83400$ | $\nu_6 = 37.2$ |
| $r_{12} = -1.0360$ | | | |

$f_2 = -1.695$

This is an embodiment of FIG. 1(B), and where, $r_1, r_2, \ldots r_{12}$ designates the radius of curvature of the lenses measured in sequence from the object side, $d_1, d_3, d_5, d_7, d_9, d_{11}$ designates the axial thickness of the lenses measured in sequence from the object side, $d_2, d_4, d_6, d_8, d_{10}$ designates the axial air spaces between the lenses measured in sequence from the object side, $n_1, n_2, \ldots n_6$ designates the refractive index of the optical glass of the lenses with respect to the d-line measured in sequence from the object side, and $\nu_1, \nu_2, \ldots \nu_6$ designates the Abbe number of the optical glass of the lenses measured with respect to d-line in sequence from the object side.

| Seidel's aberrations of Embodiment 4. | | | | |
|---|---|---|---|---|
| S | C | A | P | D |
| 1 | 0.2549 | 0.1553 | 0.0946 | 0.4229 | 0.3152 |
| 2 | 0.0255 | −0.0972 | 0.3705 | −0.1072 | −1.0030 |
| 3 | 0.5645 | 0.1531 | 0.0415 | 0.8552 | 0.2433 |
| 4 | −6.8606 | −0.3101 | −0.0140 | −1.2792 | −0.0585 |
| 5 | 5.8792 | 0.7359 | 0.0921 | 1.3162 | 0.1763 |
| 6 | −1.4179 | −0.5926 | −0.2476 | −1.2544 | −0.6277 |
| 7 | −3.7501 | 1.3339 | −0.4744 | −1.3143 | 0.6362 |
| 8 | −1.5504 | −1.7222 | −1.9131 | −0.0373 | −2.1667 |
| 9 | 1.4343 | 1.6240 | 1.8387 | 0.0172 | 2.1013 |
| 10 | 3.2868 | −0.5480 | 0.0914 | 1.0751 | −0.1945 |
| 11 | −0.0002 | 0.0044 | −0.1142 | 0.0801 | 0.8763 |
| 12 | 2.5109 | −0.7102 | 0.2009 | 0.4389 | −0.1810 |
| Σ | 0.3769 | 0.0263 | −0.0338 | 0.2132 | 0.1173 |

Seidel's aberrations show the value when the distance of the object side is set to an infinite point and a diaphragm is set to a position of 0.099 rearward of the sixth lens surface, and the symbols in the table are as follows.

S: spherical aberration
C: coma
A: astigmatism
P: Petzval's condition
D: distortion
Σ: sum of each of the aberrations

EMBODIMENT 5

| $f = 1$ F 2 | $2\omega = 56°$ | $f_B = 0.8538$ | $\Sigma d = 0.6389$ |
|---|---|---|---|
| $r_1 = 0.9814$ | $d_1 = 0.0685$ | $n_1 = 1.71300$ | $\nu_1 = 53.9$ |
| $r_2 = 3.7090$ | $d_2 = 0.0024$ | | |
| $r_3 = 0.4053$ | $d_3 = 0.0434$ | $n_2 = 1.58144$ | $\nu_2 = 40.7$ |
| $r_4 = 0.2796$ | $d_4 = 0.0454$ | | |
| $r_5 = 0.2961$ | $d_5 = 0.0869$ | $n_3 = 1.67003$ | $\nu_3 = 47.3$ |
| $r_6 = 0.3076$ | $d_6 = 0.1834$ | | |
| $r_7 = -0.3132$ | $d_7 = 0.0193$ | $n_4 = 1.72825$ | $\nu_4 = 28.5$ |
| $r_8 = 4.0871$ | $d_8 = 0.0014$ | | |
| $r_9 = 4.4515$ | $d_9 = 0.1219$ | $n_5 = 1.69680$ | $\nu_5 = 55.5$ |
| $r_{10} = -0.3747$ | $d_{10} = 0.0024$ | | |
| $r_{11} = 16.6489$ | $d_{11} = 0.0639$ | $n_6 = 1.83400$ | $\nu_6 = 37.2$ |
| $r_{12} = -0.9391$ | | | |

$f_2 = -1.776$

This is another embodiment of FIG. 1(B). Each of the symbols used herein is the same as that used in Embodiment 4.

| Seidel's aberrations of Embodiment 5. | | | | |
|---|---|---|---|---|
| S | C | A | P | D |
| 1 | 0.2560 | 0.1630 | 0.1038 | 0.4241 | 0.3363 |
| 2 | 0.0219 | −0.0878 | 0.3526 | −0.1122 | −0.9655 |
| 3 | 0.7694 | 0.1963 | 0.0501 | 0.9072 | 0.2443 |
| 4 | −7.2221 | −0.4641 | −0.0298 | −1.3151 | −0.0864 |
| 5 | 6.2365 | 0.8686 | 0.1210 | 1.3552 | 0.2056 |
| 6 | −1.7196 | −0.6840 | −0.2721 | −1.3041 | −0.6270 |
| 7 | −4.4021 | 1.4818 | −0.4988 | −1.3454 | 0.6208 |
| 8 | −2.3472 | −2.2302 | −2.1190 | −0.1031 | −2.1113 |

| Seidel's aberrations of Embodiment 5. | | | | |
|---|---|---|---|---|
| S | C | A | P | D |
| 9 | 2.2635 | 2.1663 | 2.0734 | 0.0923 | 2.0727 |
| 10 | 3.6913 | −0.6397 | 0.1109 | 1.0960 | −0.2092 |
| 11 | −0.0023 | 0.0178 | −0.1362 | 0.0273 | 0.8302 |
| 12 | 2.8765 | −0.7851 | 0.2143 | 0.4842 | −0.1906 |
| Σ | 0.4217 | 0.0032 | −0.0299 | 0.2063 | 0.1198 |

Seidel's aberrations show the value when the distance of the object side is set to an infinite point and a diaphragm is set to a position of 0.092 rearward of the sixth lens surface, and the symbols in the table are as follows.

S: spherical aberration
C: coma
A: astigmatism
P: Petzval's condition
D: distortion
Σ: sum of each of the aberrations

What is claimed is:

1. A semi wide angle objective lens constituting of five groups of six lens elements formed a front group having the first group of a positive meniscus single lens $L_1$ with its convex surface directed toward the object side, the second group of a negative meniscus single lens $L_2$ with its convex surface directed toward the object side and the third group of a positive meniscus single lens $L_3$ with its convex surface directed toward the object side, and forming a rear group having the fourth group of a negative lens $L_4$ with its concave surface having a large curvature directed toward the object side and of a positive lens $L_5$ with its convex surface having a large curvature directed toward an image side which are arranged with a mutual contact condition therebetween, and the fifth group of a positive lens $L_6$ characterized in that each of the following conditions, i.e.

$$1.69 f < |f_2| < 1.79 f \quad (1)$$

$$0.27 f < r_4 < 0.29 f \quad (2)$$

$$0.045 f < d_4 < 0.054 f \quad (3)$$

$$0.94 < r_4/r_5 < 0.096 \quad (4)$$

where,
f: the composite focal length of the entire lens system
$f_2$: the single focal length of the lens $L_2$ of the second group
$r_4$: the radius of curvature of the rear surface of the lens $L_2$ of the second group
$d_4$: the axial air space between the lens $L_2$ of the second group and lens $L_3$ of the third group
$r_5$: the radius of curvature of the front surface of the lens $L_3$ of the third group
is fulfilled.

2. Semi wide angle objective lens for fulfilling the condition as set forth in claim 1 constructed according to the constructional data given herebelow:

| $f = 1$ F 1.8 | $2\omega = 56°$ | $f_B = 0.8464$ | |
|---|---|---|---|
| $r_1 = 0.9951$ | $d_1 = 0.0725$ | $n_1 = 1.71300$ | $\nu_1 = 53.9$ |
| $r_2 = 3.9769$ | $d_2 = 0.0024$ | | |
| $r_3 = 0.4274$ | $d_3 = 0.0483$ | $n_2 = 1.58144$ | $\nu_2 = 40.7$ |
| $r_4 = 0.2873$ | $d_4 = 0.0531$ | | |
| $r_5 = 0.3052$ | $d_5 = 0.0966$ | $n_3 = 1.67003$ | $\nu_3 = 47.3$ |
| $r_6 = 0.3126$ | $d_6 = 0.2029$ | | |

-continued

| $f = 1$ F 1.8 | $2\omega = 56°$ | $f_B = 0.8464$ | |
|---|---|---|---|
| $r_7 = -0.3341$ | $d_7 = 0.0217$ | $n_4 = 1.75520$ | $\nu_4 = 27.5$ |
| $r_8 = 38.9089$ | $d_8 = 0.1329$ | $n_5 = 1.67790$ | $\nu_5 = 55.3$ |
| $r_9 = -0.3966$ | $d_9 = 0.0024$ | | |
| $r_{10} = 11.2319$ | $d_{10} = 0.0725$ | $n_6 = 1.88300$ | $\nu_6 = 40.8$ |
| $r_{11} = -0.9167$ | | | | where, $r_1, r_2, \ldots r_{11}$: the radius of curvature of the lens measured in sequence from the object side $d_1, d_3, d_5, d_7, d_8, d_{10}$: the axial thickness of the lens measured in sequence from the object side $d_2, d_4, d_6, d_9$: the axial air space between the lenses measured in sequence from the object side $n_1, n_2, \ldots n_6$: the refractive index of the optical glass of the lens with respect to the d-line measured in sequence from the object side $\nu_1, \nu_2, \ldots \nu_6$: Abbe number of the optical glass of the lens measured with respect to d-line in sequence from the object side.

3. Semi wide angle objective lens for fulfilling the condition as set forth in claim 1 constructed according to the constructional data given herebelow:

| $f = 1$ F 1.84 | $2\omega = 56°$ | $f_B = 0.8443$ | |
|---|---|---|---|
| $r_1 = 0.9963$ | $d_1 = 0.0724$ | $n_1 = 1.71300$ | $\nu_1 = 53.9$ |
| $r_2 = 3.9165$ | $d_2 = 0.0024$ | | |
| $r_3 = 0.4165$ | $d_3 = 0.0458$ | $n_2 = 1.58144$ | $\nu_2 = 40.7$ |
| $r_4 = 0.2851$ | $d_4 = 0.0531$ | | |
| $r_5 = 0.3015$ | $d_5 = 0.0965$ | $n_3 = 1.67003$ | $\nu_3 = 47.3$ |
| $r_6 = 0.3057$ | $d_6 = 0.1978$ | | |
| $r_7 = -0.3287$ | $d_7 = 0.0210$ | $n_4 = 1.76182$ | $\nu_4 = 26.6$ |
| $r_8 = 8.4698$ | $d_8 = 0.1303$ | $n_5 = 1.71300$ | $\nu_5 = 53.9$ |
| $r_9 = -0.3998$ | $d_9 = 0.0024$ | | |
| $r_{10} = 11.3076$ | $d_{10} = 0.0724$ | $n_6 = 1.83400$ | $\nu_6 = 37.2$ |
| $r_{11} = -0.8810$ | | | | where, $r_1, r_2, \ldots r_{11}$: the radius of curvature of the lens measured in sequence from the object side $d_1, d_3, d_5, d_7, d_8, d_{10}$: the axial thickness of the lens measured in sequence from the object side $d_2, d_4, d_6, d_9$: the axial air space between the lenses measured in sequence from the object side $n_1, n_2, \ldots n_6$: the refractive index of the optical glass of the lens with respect to the d-line measured in sequence from the object side $\nu_1, \nu_2, \ldots \nu_6$: Abbe number of the optical glass of a lens measured with respect to d-line in sequence from the object side.

4. Semi wide angle objective lens for fulfilling the condition as set forth in claim 1 constructed according to the constructional data given herebelow:

| $f = 1$ F 2 | $2\omega = 56°$ | $f_B = 0.8518$ | |
|---|---|---|---|
| $r_1 = 0.9272$ | $d_1 = 0.0689$ | $n_1 = 1.71300$ | $\nu_1 = 53.9$ |
| $r_2 = 3.3721$ | $d_2 = 0.0024$ | | |
| $r_3 = 0.4119$ | $d_3 = 0.0447$ | $n_2 = 1.58144$ | $\nu_2 = 40.7$ |
| $r_4 = 0.2803$ | $d_4 = 0.0456$ | | |
| $r_5 = 0.2950$ | $d_5 = 0.0864$ | $n_3 = 1.67003$ | $\nu_3 = 47.3$ |
| $r_6 = 0.3038$ | $d_6 = 0.1816$ | | |
| $r_7 = -0.3076$ | $d_7 = 0.0194$ | $n_4 = 1.71736$ | $\nu_4 = 29.5$ |
| $r_8 = 2.4272$ | $d_8 = 0.1214$ | $n_5 = 1.69680$ | $\nu_5 = 55.5$ |
| $r_9 = -0.3800$ | $d_9 = 0.0024$ | | |
| $r_{10} = -24.2718$ | $d_{10} = 0.0631$ | $n_6 = 1.83400$ | $\nu_6 = 37.2$ |
| $r_{11} = -0.8295$ | | | | where, $r_1, r_2, \ldots r_{11}$: the radius of curvature of the lens measured in sequence from the object side $d_1, d_3, d_5, d_7, d_8, d_{10}$: the axial thickness of the lens measured in sequence from the object side $d_2, d_4, d_6, d_9$: the axial air space between the lenses measured in sequence from the object side $n_1, n_2, \ldots n_6$: the refractive index of the optical glass of the lens with respect to the d-line measured in sequence from the object side $\nu_1, \nu_2, \ldots \nu_6$: Abbe number of the optical glass of the lens measured with respect to d-line in sequence from the object side.

5. Semi wide angle objective lens for fulfilling the condition as set forth in claim 1 constructed according to the constructional data given herebelow:

| $f = 1$ F 1.84 | $2\omega = 56°$ | $f_B = 0.8434$ | |
|---|---|---|---|
| $r_1 = 0.9841$ | $d_1 = 0.0700$ | $n_1 = 1.71300$ | $\nu_1 = 53.9$ |
| $r_2 = 3.8830$ | $d_2 = 0.0024$ | | |
| $r_3 = 0.4285$ | $d_3 = 0.0459$ | $n_2 = 1.57845$ | $\nu_2 = 41.5$ |
| $r_4 = 0.2865$ | $d_4 = 0.0483$ | | |
| $r_5 = 0.3048$ | $d_5 = 0.0954$ | $n_3 = 1.67003$ | $\nu_3 = 47.3$ |
| $r_6 = 0.3198$ | $d_6 = 0.1981$ | | |
| $r_7 = -0.3290$ | $d_7 = 0.0205$ | $n_4 = 1.76180$ | $\nu_4 = 27.1$ |
| $r_8 = 11.5942$ | $d_8 = 0.0024$ | | |
| $r_9 = 24.1546$ | $d_9 = 0.1292$ | $n_5 = 1.71300$ | $\nu_5 = 53.9$ |
| $r_{10} = -0.3871$ | $d_{10} = 0.0024$ | | |
| $r_{11} = 5.6763$ | $d_{11} = 0.0628$ | $n_6 = 1.83400$ | $\nu_6 = 37.2$ |
| $r_{12} = -1.0360$ | | | | where, $r_1, r_2, \ldots r_{12}$: the radius of curvature of the lens measured in sequence from the object side $d_1, d_3, d_5, d_7, d_9, d_{11}$: the axial thickness of the lens measured in sequence from the object side $d_2, d_4, d_6, d_8, d_{10}$: the axial air space between the lenses measured in sequence from the object side $n_1, n_2, \ldots n_6$: the refractive index of the optical glass of the lens with respect to the d-line measured in sequence from the object side $\nu_1, \nu_2, \ldots \nu_6$: Abbe number of the optical glass of the lens measured with respect to d-line in sequence from the object side.

6. Semi wide angle objective lens for fulfilling the condition as set forth in claim 1 constructed according to the constructional data given herebelow:

| $f = 0 1$ F 2 | $2\omega = 56°$ | $f_B = 0.8538$ | |
|---|---|---|---|
| $r_1 = 0.9814$ | $d_1 = 0.0685$ | $n_1 = 1.71300$ | $\nu_1 = 53.9$ |
| $r_2 = 3.7090$ | $d_2 = 0.0024$ | | |
| $r_3 = 0.4053$ | $d_3 = 0.0434$ | $n_2 = 1.58144$ | $\nu_2 = 40.7$ |
| $r_4 = 0.2796$ | $d_4 = 0.0454$ | | |
| $r_5 = 0.2961$ | $d_5 = 0.0869$ | $n_3 = 1.67003$ | $\nu_3 = 47.3$ |
| $r_6 = 0.3076$ | $d_6 = 0.1834$ | | |
| $r_7 = -0.3132$ | $d_7 = 0.0193$ | $n_4 = 1.72825$ | $\nu_4 = 28.5$ |
| $r_8 = 4.0871$ | $d_8 = 0.0014$ | | |
| $r_9 = 4.4515$ | $d_9 = 0.1219$ | $n_5 = 1.69680$ | $\nu_5 = 55.5$ |
| $r_{10} = -0.3747$ | $d_{10} = 0.0024$ | | |
| $r_{11} = 16.6489$ | $d_{11} = 0.0639$ | $n_6 = 1.83400$ | $\nu_6 = 37.2$ |
| $r_{12} = -0.9391$ | | | | where, $r_1, r_2, \ldots r_{12}$: the radius of curvature of the lens measured in sequence from the object side $d_1, d_3, d_5, d_7, d_9, d_{11}$: the axial thickness of the lens measured in sequence from the object side $d_2, d_4, d_6, d_8, d_{10}$: the axial air space between the lenses measured in sequence from the object side $n_1, n_2, \ldots n_6$: the refractive index of the optical glass of the lens with respect to the d-line measured in sequence from the object side $\nu_1, \nu_2, \ldots \nu_6$: Abbe number of the optical glass of the lens measured with respect to d-line in sequence from the object side.

7. A semi wide angle objective lens constituting of five groups of six lens elements forming a front group having the first group of a positive meniscus single lens $L_1$ with its convex surface directed toward the object side, the second group of a negative meniscus single lens $L_2$ with its convex surface directed toward the object side and the third group of a positive meniscus single lens $L_3$ with its convex surface directed toward the object side, and forming a rear group having the fourth group of a negative lens $L_4$ with its concave surface having a large curvature directed toward the object side and of a positive lens $L_5$ with its convex surface having a large curvature directed toward an image side which are arranged with an extremely small air space therebetween, and the fifth group of a positive lens $L_6$ characterized in that each of the following conditions, i.e.

$$1.69\,f < |f_2| < 1.79\,f \quad (1)$$

$$0.27\,f < r_4 < 0.29\,f \quad (2)$$

$$0.045\,f < d_4 < 0.054\,f \quad (3)$$

$$0.94 < r_4/r_5 < 0.96 \quad (4)$$

where
- $f$: the composite focal length of the entire lens system
- $f_2$: the single focal length of the lens $L_2$ of the second group
- $r_4$: the radius of curvature of the rear surface of the lens $L_2$ of the second group
- $d_4$: the axial air space between the $L_2$ of the second group and lens $L_3$ of the third group
- $r_5$: the radius of curvature of the front surface of the lens $L_3$ of the third group is fulfilled.

* * * * *

UNITED STATES PATENT AND TRADEMARK OFFICE
CERTIFICATE OF CORRECTION

PATENT NO. : 4,214,815
DATED : July 29, 1980
INVENTOR(S) : Toshiko Shimokura

It is certified that error appears in the above—identified patent and that said Letters Patent is hereby corrected as shown below:

Column 1, line 17, after "with" the letter -- f -- should have been inserted therefor.

Column 6, line 21, "n" should have read -- $\underline{n}$ --.

Column 10, line 45, "0.096" should read -- 0.96 --.

Signed and Sealed this

Twenty-fifth Day of November 1980

[SEAL]

Attest:

SIDNEY A. DIAMOND

Attesting Officer    Commissioner of Patents and Trademarks